United States Patent [19]

Geise

[11] 4,377,257

[45] Mar. 22, 1983

[54] MATERIAL FLUIDIZING APPARATUS

[75] Inventor: Howard F. Geise, Whitehouse Station, N.J.

[73] Assignee: Sealed Air Corporation, Saddle Brook, N.J.

[21] Appl. No.: 320,321

[22] Filed: Nov. 12, 1981

Related U.S. Application Data

[63] Continuation of Ser. No. 37,477, May 9, 1979, abandoned, which is a continuation of Ser. No. 767,354, Feb. 10, 1977, Pat. No. 4,186,256.

[51] Int. Cl.³ .............................................. F23D 11/16
[52] U.S. Cl. .................................. 239/419.3; 239/433
[58] Field of Search ...................... 239/433, 419, 419.3, 239/424.5, 428, 112, 113, 318

[56] References Cited

U.S. PATENT DOCUMENTS

| | | | |
|---|---|---|---|
| 2,764,565 | 9/1956 | Hoppe et al. | 260/2.5 |
| 3,231,200 | 1/1966 | Heald | 239/318 |
| 3,332,442 | 7/1967 | Reed | 239/433 X |
| 3,434,805 | 3/1969 | Bar | 260/2.5 |
| 3,462,083 | 8/1969 | Kautz | 239/400 |
| 3,592,208 | 7/1971 | Kimmel | 137/81.5 |
| 3,627,706 | 12/1971 | Chant | 260/2.5 |
| 3,726,297 | 4/1973 | Heimann et al. | 137/154 X |
| 3,769,232 | 10/1973 | Houldridge | 252/359 |
| 4,186,256 | 1/1980 | Geise | 239/428 |

Primary Examiner—John J. Love
Assistant Examiner—Gene A. Church
Attorney, Agent, or Firm—Eugene E. Geoffrey, Jr.

[57] ABSTRACT

A method and apparatus for fluidizing materials wherein a gas such as air is fed into conduits through which the materials to be fluidized flow under pressure, said air being fed into the material conducting conduits at angles in the range of 60° to 120° relative to the direction of material flow, the material conducting conduits being coupled with a third conduit for mixing the fluidized materials. The material conducting conduits are flushed by insertion in a container having means for effecting the flow of a solvent and a gas such as air therethrough.

1 Claim, 13 Drawing Figures

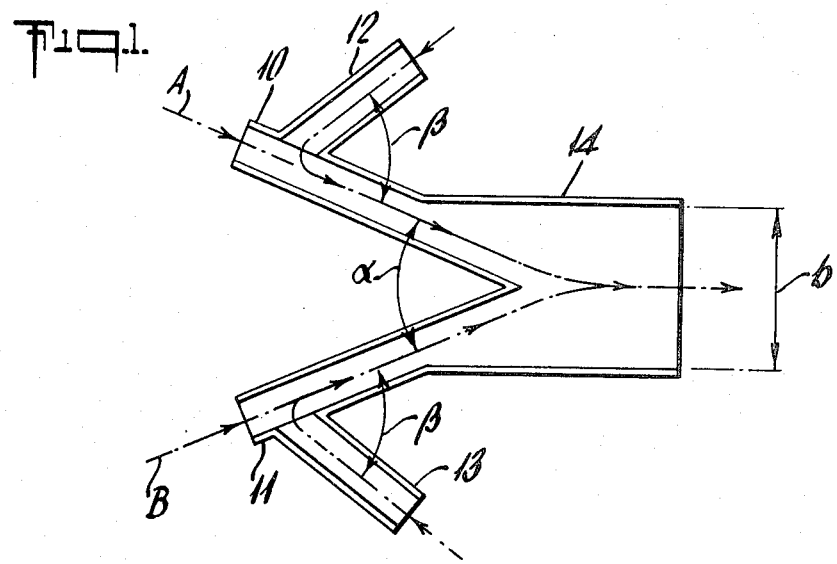
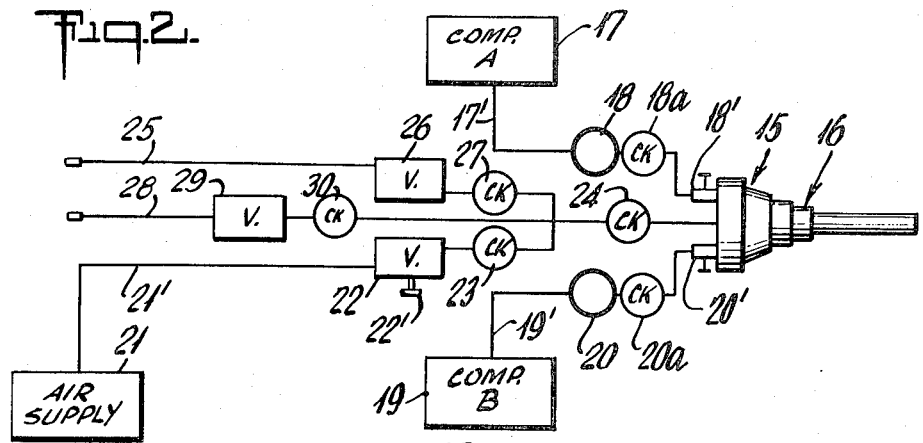
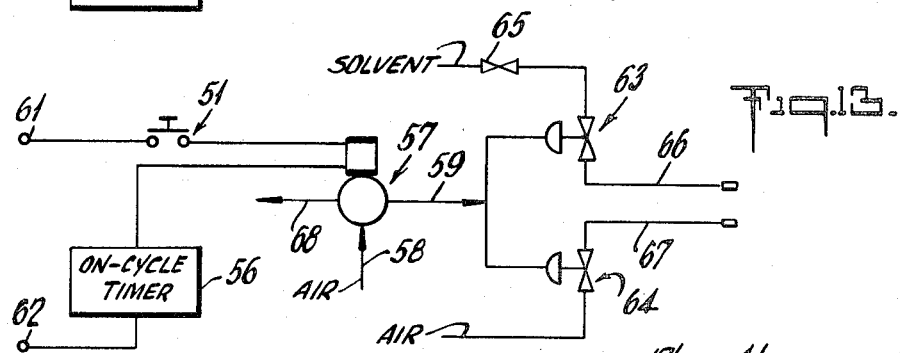
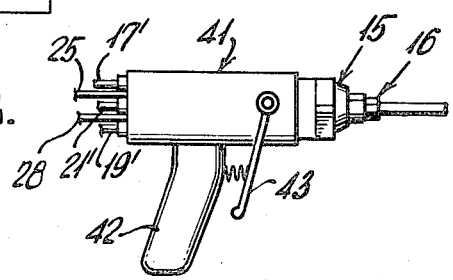

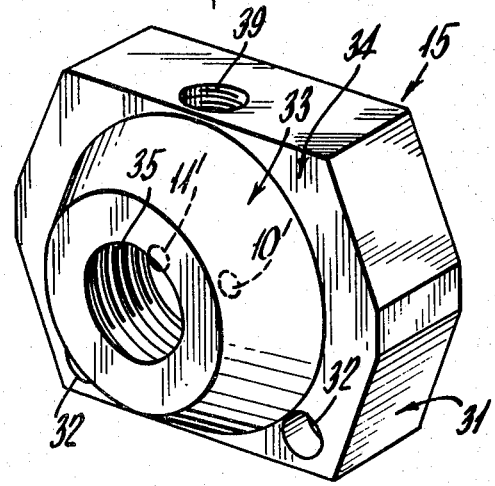
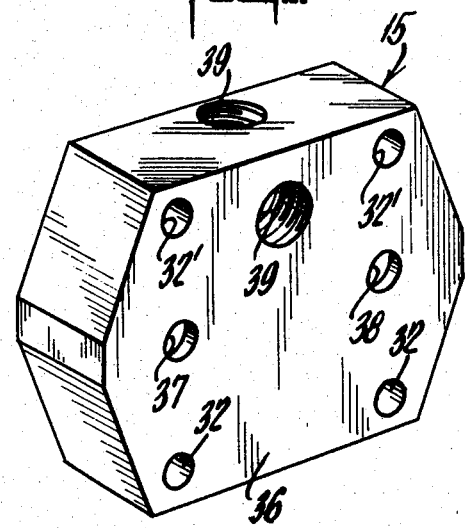
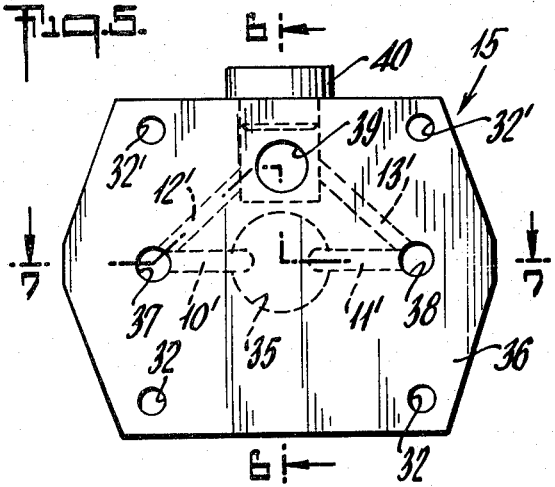
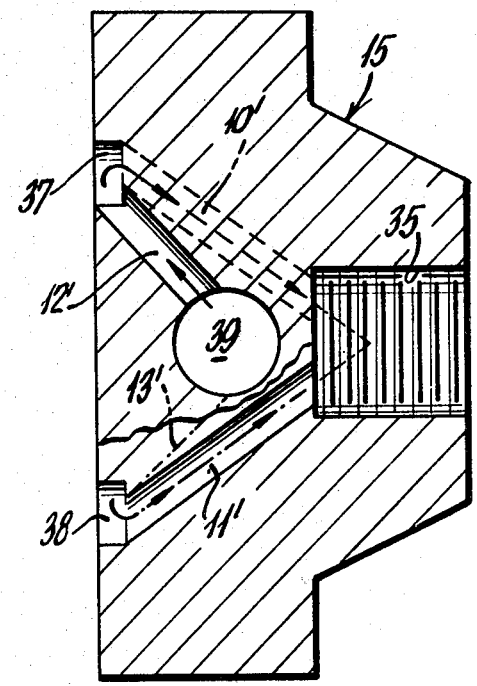
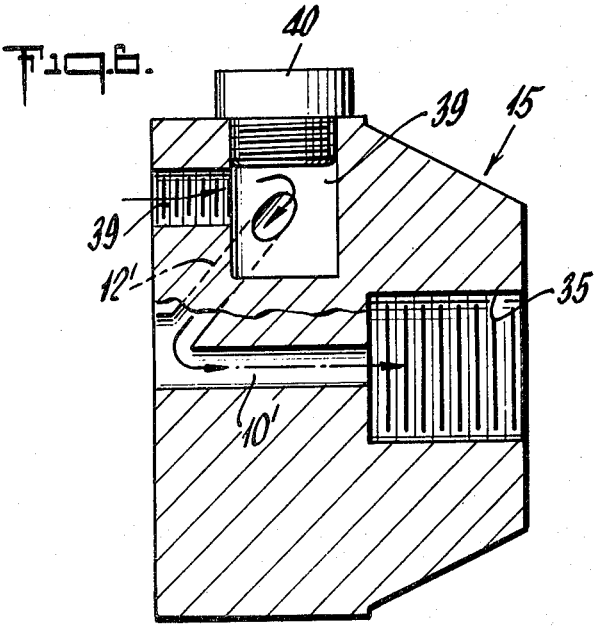

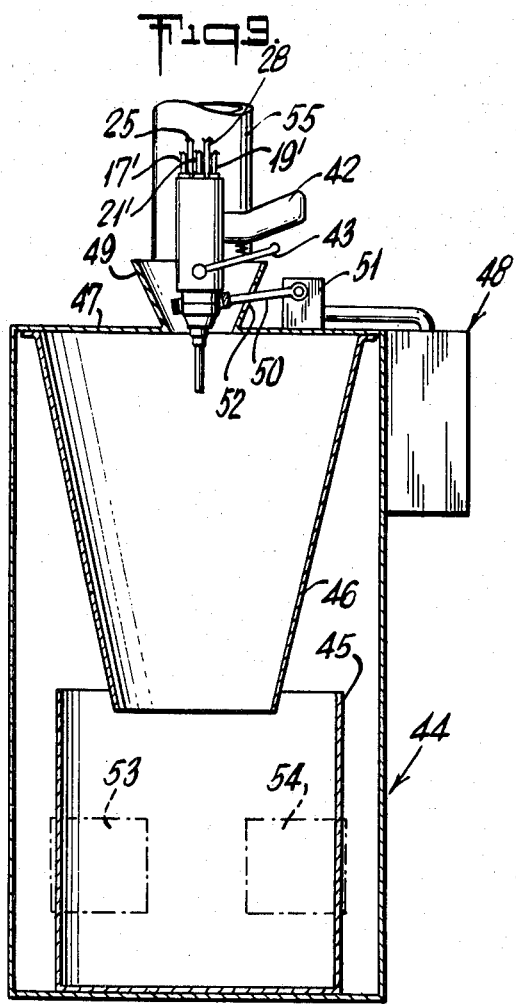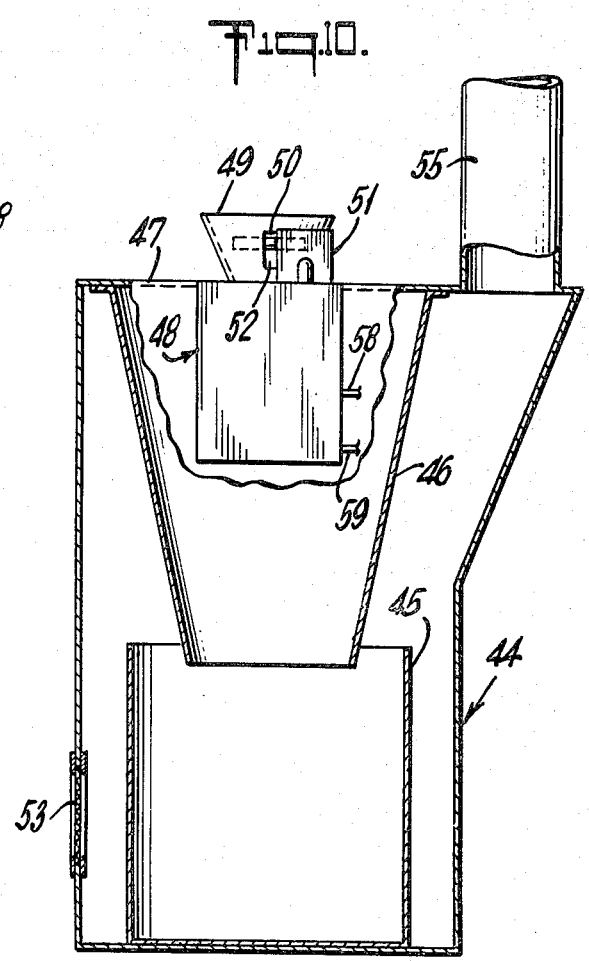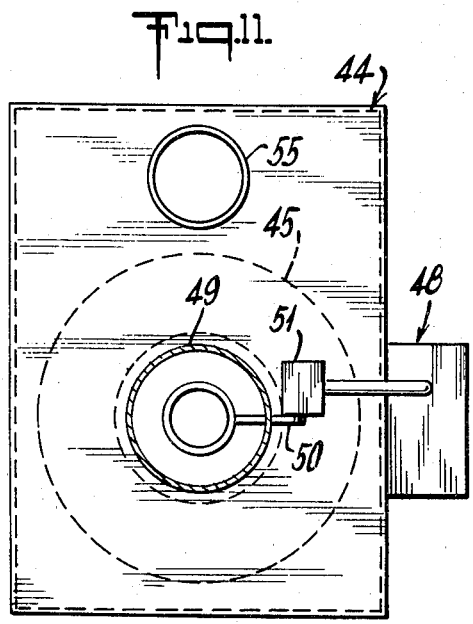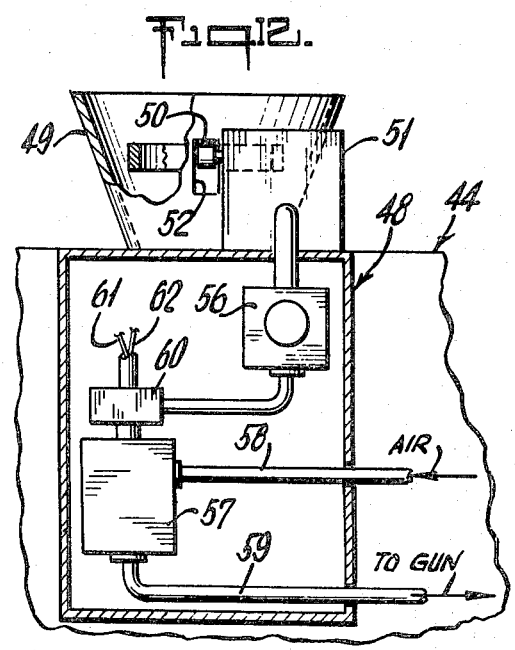

MATERIAL FLUIDIZING APPARATUS

This application is a continuation of application Ser. No. 037,477 filed May 9, 1979 now abandoned entitled "APPARATUS FOR MIXING VISCOUS LIQUIDS" which is a continuation of application Ser. No. 767,354 filed Feb. 10, 1977, now United States Patent No. 4,186,256 granted Jan. 29, 1980 entitled "PROCESS AND APPARATUS FOR MIXING VISCOUS LIQUIDS".

This invention relates to the fluidizing and mixing of viscous materials and more specifically to methods and apparatus for fluidizing and mixing viscous chemicals as for instance chemicals which when intermixed expand and harden to produce a light foam-like structure particularly useful for packaging, insulating and other similar purposes. The invention further contemplates the provision of a novel and improved method and apparatus for flushing the fluidizing apparatus each time it is used.

Prior known devices for fluidizing viscous chemicals which then expand to produce a foam-like structure have not been found to be satisfactory because of the failure to attain thorough intermixing of the chemicals to produce a uniform resultant foam and repeated clogging of the apparatus because of ineffective means for flushing with the result that the apparatus had to be frequently disassembled for cleaning.

This invention has as one of its objects the provision of a novel and improved method and apparatus which effectively fluidize the viscous materials to be mixed and thoroughly intermixes the fluidized materials to produce a substantially homogenous and uniform resultant product.

Another object of the invention resides in the provision of a novel and improved method and apparatus for fluidizing viscous materials.

Still another object of the invention resides in the provision of a novel and improved method and apparatus for fluidizing viscous materials and intermixing them to produce a plastic foam for use in packaging.

A further object of the invention resides in the provision of a novel and improved method and apparatus for cleaning the apparatus utilized for fluidizing viscous materials.

The objects of the invention are attained by feeding the viscous liquids through tubes and then injecting air into the tubes at sharp angles and preferably angles which inject the air in directions slightly against the flow of the liquid. The two liquids after being individually fluidized are then intermixed. When liquids are intended for use in producing a foam for packaging purposes, the mixed fluidized liquids are deposited in a container whereupon they foam and harden about the article being packaged. After use of the fluidizing apparatus, the nozzle is inserted into a container and in so doing a cleaning liquid is automatically fed therethrough and the resulting vapors within the container are exhausted to prevent polution of the air and thereby protect the user from the adverse effects of such vapors. In this way, the apparatus is automatically cleaned after each use and minimizes the accumulation of hardened deposits which ultimately cause clogging of the passages.

The above and other objects and advantages of the invention will become evident from the following description and accompanying drawings forming part of this application.

In the drawings:

FIG. 1 is a cross-sectional diagrammatic view of one embodiment of mixing apparatus in accordance with the invention.

FIG. 2 is a schematic diagram of the fluid control system for feeding viscous fluids and air to the mixing apparatus or gun.

FIGS. 3 and 4 are front and rear perspective views of one embodiment of a fluidizing and mixing housing in accordance with the invention.

FIG. 5 is a rear elevational view of the housing of FIG. 4 showing internal passages in broken lines.

FIGS. 6 and 7 are cross-sectional views of FIG. 5 taken along the lines 6—6 and 7—7 of FIG. 5.

FIG. 8 is a side elevational view of a fluidizing and mixing gun embodying the housing shown in FIGS. 3 through 7.

FIG. 9 is a side elevational view in partial section of gun cleaning and flushing apparatus in accordance with the invention.

FIG. 10 is a side elevational view in partial section of apparatus shown in FIG. 9 taken in the direction of arrows 10—10 thereof.

FIG. 11 is a top view of the apparatus shown in FIG. 9 with the gun removed.

FIG. 12 is an enlarged view in partial section of certain control elements for the cleaning and flushing procedure.

FIG. 13 is a schematic diagram of the control elements for automatically flushing the gun after use.

Referring now to the drawings and more specifically to FIG. 1 which illustrates one embodiment of the invention for fluidizing and mixing two liquids. While the apparatus is useful for fluidizing any type of viscous liquids, for the purpose of this description it will be described in connection with the fluidizing and mixing of an isocyanate with a polyol to produce a urethane foam product particularly useful for packaging. Examples of an isocyanate and a polyol that may be used are those manufactured by MR Plastics, Inc., at 11460 Dorsett Road, Maryland Heights, Mo., and sold under the designations 775S and 717H, respectively.

In FIG. 1, the two liquids to be fluidized and mixed are denoted by the letters A and B and fed in the direction of the arrows through conduits 10 and 11. A fluidizing gas such as air is fed through conduit 12 which communicates with conduit 10 at s steep angle $\beta$ which is preferably of the order to 60° to 120° relative to the flow of the liquid. A fluidizing gas is also fed through conduit 13 which communicates with conduit 11 at a steep angle $\beta$ which is also preferably between 60° and 120°. The tubes or conduits 10 and 11 are angularly disposed at an angle $\alpha$, generally in the range of 45° to 90°, and converge in and communicate with a mixing tube substantially larger in diameter than the tubes 10 and 11. In the illustrated embodiment of the invention, the tubes 10 and 11 are approximately 3/16" ID while the tube 14 is approximately ¾" ID. The liquids A and B, in the case of an isocyanate and polyol, may be fed into tubes 10 and 11 at the rate of about 0.03 to 0.04 cubic feet per minute while air is introduced at the rate of about 2 cubic feet per minute. It is evident that other ratios of liquid to air or gas may also be employed depending on the mode of operation and nature of the liquids.

With the structure thus far described, it has been found that substantially complete fluidization of each of the liquids is attained within the tubes 10 and 11 with the result that complete intermixture of the two liquids occurs within the tube 14. This procedure when producing a polyurethane foam insures the production of a substantially uniform product and thus provides a more effective packaging material.

FIG. 2 is a diagrammatic illustration of the fluidizing and mixing apparatus including the control system. More specifically, the apparatus described in connection with FIG. 1 is incorporated within the housing 15 which has a nozzle 16 extending therefrom. Component A is fed from a container or supply 17 through a metering valve 18, check valve 18a and control valve 18' to the housing 15 while component B is fed from a container or supply 19 through a metering valve 20, check valve 20a and control valve 20' to the housing 15. The fluidizing air is fed from a supply 21 through a metering valve 22 and check valves 23 and 24 to the housing 15. The flushing circuits include the solvent conduit 25, a control valve 26, and check valve 27 and an air conduit 28, a control valve 29 and check valve 30.

One embodiment of the housing 15 in accordance with the invention is illustrated in FIGS. 3 through 6. It consists esstentially of the solid block portion 31 having lower mounting holes 32 and a conical portion 33 integral with and extending from the surface 34 of the block. A pair of upper mounting holes 32' are formed in the rear surface 36 of the block and are internally threaded to receive mounting bolts. A threaded opening 35 is formed in the conical portion 33 to receive the nozzle 16 and extends partially into the block 31. The tubes 10 and 11 of FIG. 1 correspond to the passages 10' and 11' which extend between openings 37 and 38 in the rear face 36 of the block and the opening 35. Air is fed to the block through a rear opening 39 which is coupled to the passages 10' and 11' by passages 12' and 13', respectively, the latter intersecting the passages 10' and 11' in this embodiment of the invention at angles less than 90° and against the flow of components A and B. The opening 39 formed in the top of the block 31 is an access hole which is normally closed by a plug 40.

The completed fluidizing and mixing gun 41 is shown in FIG. 8 and includes a shell 41' containing valves 18, 18a, 18', 20, 20a, 20', 22, 23, 24, 26, 27, 29, and 30 and supporting the housing 15 and nozzle 16. A handle 42 extends from the shell and an actuating arm 43 is pivotally supported by the shell. The arm 43 is mechanically coupled to control valves 18' and 20', and actuator 22' forming part of the valve 22 so that operation of the arm will initiate the flow of the components and air or gas through the housing 15 to effect fluidization and mixing of the components. To the left of the shell 41' are three inlet conduits 17', 19' and 21' which couple the gun to the component and air supplies. The additional inlet conduits 25 and 28 are provided for flushing the gun as will be described.

The flushing apparatus is shown in FIGS. 9 through 13 and comprises a container generally denoted by the numeral 44. It includes a receptacle 45 disposed therein for receiving the flushing liquid such as methylene chloride or other suitable solvent depending upon the nature of the components A and B as well as residual components in the housing and nozzle. A conical or funnel like structure 46 extends from the top wall 47 of container 44 and terminates within the receptacle. The top wall 47 includes a small opening 48 surrounded by a conical wall 49 for receiving the gun 41 after each use thereof. A flushing actuating lever 50 pivotally carried by a limit switch control box 51 on the top wall 47 extends through an opening 52 in the wall 49 so that it is depressed each time the gun is inserted in the container 44 as shown in FIG. 9. The container 44 also includes two air inlets 53 and 54 and an exhaust pipe 55 connected with a suitable suction system not shown to exhaust vapors produced by the flushing process.

When the gun 41 is inserted in the container 44 and depresses lever 50, the latter operates the switch within the box 51 and actuates an on-cycle timer 56 which in turn operates an air control solenoid valve 57 having an inlet air conduit 58 and an outlet air conduit 59. Energy for operation of the timer and valve 57 is fed to the box 60 through conductors 61 and 62 and the details of the circuitry and operation will not be described in connection with FIG. 13.

Referring to FIG. 13, energy is fed from terminals 61 and 62 through switch 51 actuated by lever 50 and the relay or on-cycle timer 56 to the solenoid valve 57. When the valve 57 is actuated, air is fed from conduit 58 to conduit 59 to actuate the pilot operated valves 63 and 64. Upon application of air pressure to the valves 63 and 64, they are opened so that solvent passes through orifice 65 and valve 63 to conduit 66 while air passes through valve 64 to conduit 67.

The conduits 66 and 67 are coupled through suitable hoses to the conduits 25 and 28, respectively, which form part of the gun 41, so that when the relay operated valve 57 is actuated, a solvent and air will be fed through the air inlet 39 on the block 31 and thus clean the passages 10' through 13' of the housing 15 as well as the nozzle 16. When the cleaning or flushing operation has been completed, the timer 56 will deenergize the relay valve 57 and bypass the air in the conduit 59 through an outlet 68 to the atmosphere in order to close the valves 63 and 64.

When utilizing the apparatus in accordance with this invention with isocyanate and polyol for the purpose of producing a urethane foam, methylene chloride is the preferred solvent, and it is fed through the conduits 66 and 25 at approximately 70 PSI while air is fed through the conduits 67 and 28 at approximately 60 PSI. The air pressure entering the conduit 58 for operation of the valves 63 and 64 is at about 40 PSI.

For flushing purposes it is preferable that control valves 18' and 20' be placed in adjoining relationship with the housing and that the passages 12' and 13' in the housing feed the gas or air against the flow of the materials A and B. With this arrangement the flushing solvent and gas or air will be directed against the valves 18' and 20' and thus insure cleaning of those valves as well as the passages and nozzle. As a result the gun can be used for extended periods without the need for dismantling and cleaning.

While the invention described above is particularly useful for producing urethane foam for packaging, it is quite evident that the apparatus and method may be employed for fluidizing and intermixing viscous materials for other purposes and the specific fluidizing means for fluidizing each of the components may be used independently in order to provide effective fluidization of viscous materials to facilitate flow as well as for other purposes.

While only one embodiment of the invention has been illustrated and described, it is apparent that alterations, changes and modifications may be made without departing from the true scope and spirit thereof.

What is claimed is:

1. Apparatus for fluidizing and intermixing two viscous materials comprising a pair of conduits each having an inlet and an outlet with each conduit carrying one of said viscous materials, a third mixing conduit joined to the outlets of the first said conduits with at least the outlet portions of each of the first said conduits being angularly disposed relative to said third mixing conduit and to the other of said pair of conduits, means for forcing said viscous materials individually under pressure into the inlets of and through each of said pair of conduits, a second pair of conduits each coupled to and communicating with one of the first said pair of conduits and angularly disposed relative thereto for the injection of a compressed gas into the said first pair of conduits and counter to the flow of said viscous materials therethrough, and means for feeding compressed gas to each of said second pair of conduits, whereby said gas will intermix with and fluidize the materials in each of the first said pair of conduits and the fluidized materials will each then enter said third mixing conduit at an angle one relative to the other and to said third mixing conduit and become thoroughly intermixed one with the other in said third mixing conduit.

* * * * *